J. B. HUTCHINSON.
DISTRIBUTER.
APPLICATION FILED MAY 5, 1910.
964,971.
Patented July 19, 1910.
2 SHEETS—SHEET 1.
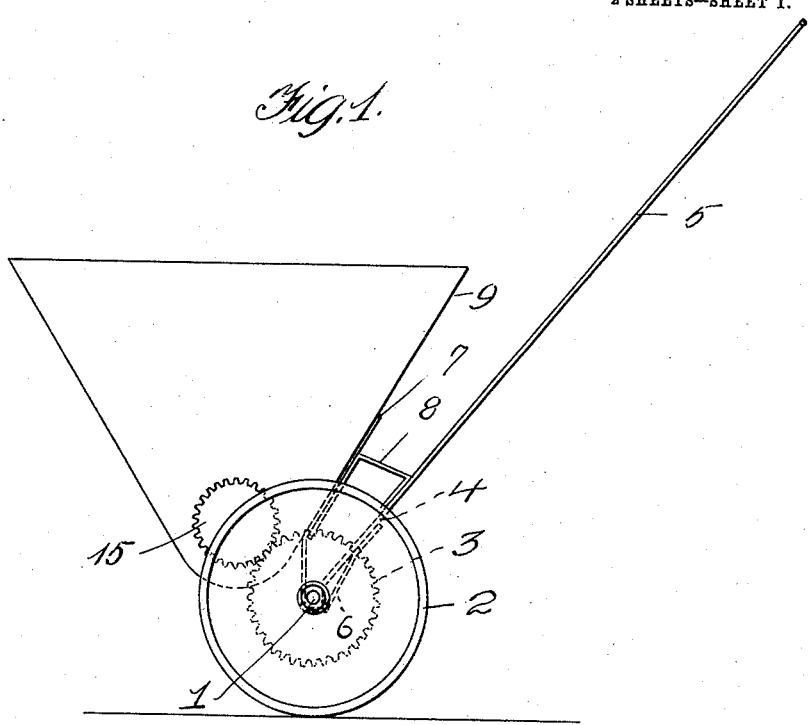
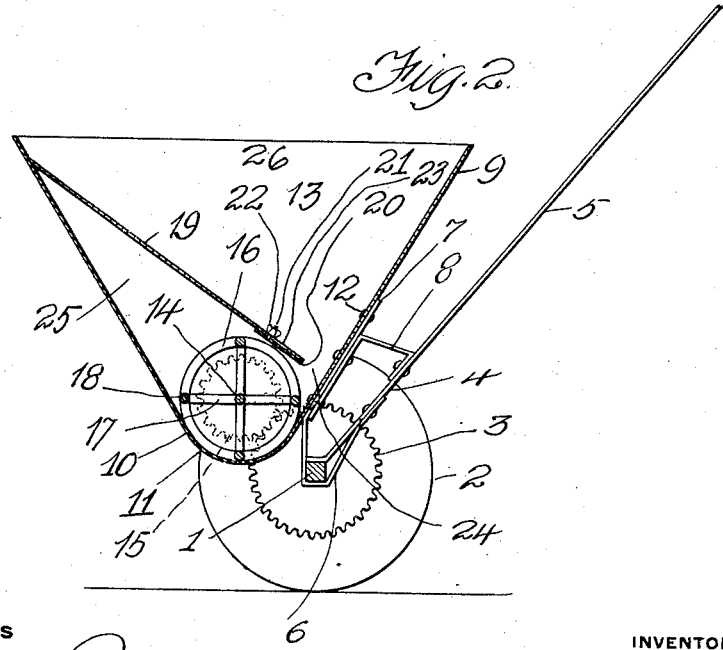
WITNESSES
INVENTOR
J. B. Hutchinson J. B. HUTCHINSON.
DISTRIBUTER.
APPLICATION FILED MAY 5, 1910.
964,971.
Patented July 19, 1910.
2 SHEETS—SHEET 2.
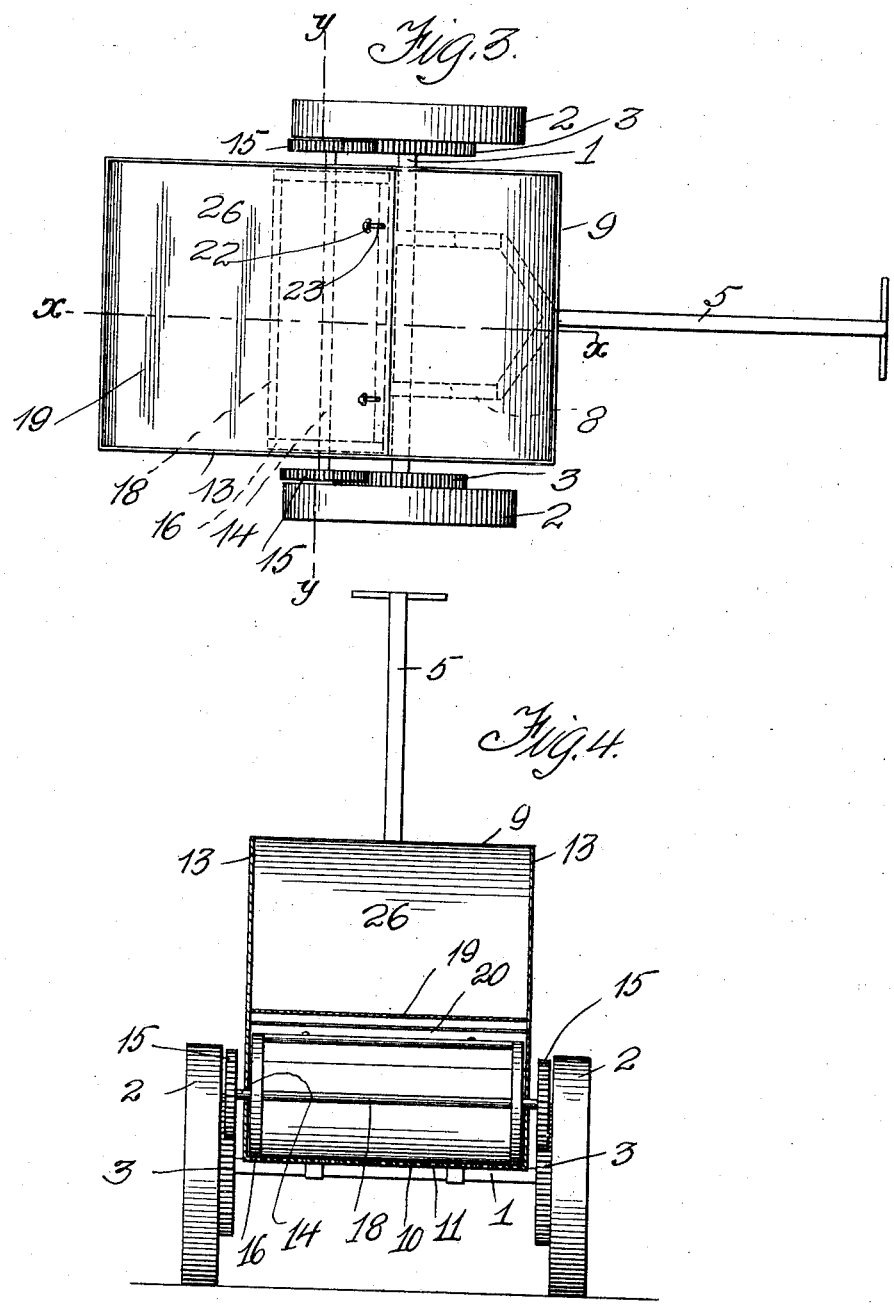
WITNESSES
INVENTOR
J. B. Hutchinson

UNITED STATES PATENT OFFICE.

JOSHUA B. HUTCHINSON, OF SCOTTDALE, PENNSYLVANIA.

DISTRIBUTER.

964,971. Specification of Letters Patent. Patented July 19, 1910.

Application filed May 5, 1910. Serial No. 559,610.

*To all whom it may concern:*

Be it known that I, JOSHUA B. HUTCHINSON, a citizen of the United States of America, residing at Scottdale, in the county of Westmoreland and State of Pennsylvania, have invented certain new and useful Improvements in Distributers, of which the following is a specification, reference being had therein to the accompanying drawing.

This invention relates to distributers designed for distributing seed, fertilizer and other matter.

The primary object of my invention is to provide a distributer that can be easily moved and operated to equally distribute matter from the bottom of the distributer.

Another object of the invention is to furnish a portable distributing implement with novel means for agitating and mixing the matter to be distributed, thereby preventing an unequal distribution of the matter.

A further object of this invention is to provide a machine of the above type that is simple in construction, durable and highly efficient for the purposes for which it is intended.

The above and such other objects as may hereinafter appear are attained by the mechanical construction shown in the drawing forming a part of this specification, wherein:—

Figure 1 is a side elevation of the distributing implement, Fig. 2 is a vertical longitudinal sectional view on line X—X, Fig. 3, Fig. 3 is a plan of the implement, and Fig. 4 is a vertical cross sectional view on line Y—Y, Fig. 3.

To put my invention into practice I provide a truck with a receptacle having a perforated bottom and in the receptacle I locate an agitator or mixer adapted to be revolved when the truck is moved.

The truck comprises an axle 1 having the ends thereof provided with revoluble wheels 2 and suitably connected to the inner sides of these wheels are large gear wheels 3 adapted to revolve with the wheels 2. Connected to the upper side of the axle 1 are the lower ends of a yoke 4 having a handle 5, said yoke being connected to the upper side of the axle 1 by straps 6 that extend upwardly in front of the axle 1 and upwardly at an angle substantially in parallelism with the yoke 4, the upwardly bent ends 7 of said straps being connected to the yoke by a brace 8.

The receptacle comprises a hopper 9 V-shaped in cross section with the bottom thereof rounded, as at 10 and provided with openings or perforations 11. The hopper 9 is connected to the angular ends 7 of the straps 6, as at 12 and journaled in the end walls 13 of said hopper is a longitudinal shaft 14 having the outer ends thereof provided with small gear wheels 15 adapted to mesh with the large gear wheels 3, whereby the shaft 14 will be revolved when the truck is moved. Mounted upon the shaft 14 at the inner sides of the walls 13 are circular heads or rings 16 supported by spokes 17 radiating from the shaft 14 and these heads or rings are connected by longitudinal bars or blades 18, these bars being equally spaced apart and adapted to move in proximity to the perforated bottom of the hopper.

The hopper 9 is provided with an angularly disposed partition 19 extending from within proximity of the upper front edge of the hopper to a point remote from the rear wall of the hopper, the lower edge of the partition being above the bars 18, which constitute the agitating or mixing means of the implement. The lower edge of the angularly disposed partition 19 is provided with a slide 20 adjustably held in engagement with the partition 19 by bolts 21 and wing thumb nuts 22, said bolts extending through slots 23 provided therefor in the partition. The slide 20 can be adjusted to regulate the area of the opening 24 between the lower edge of the partition 19 and the rear inclined wall of the hopper.

When the distributing implement is moved over the ground, the agitator or mixer within the hopper is revolved to prevent the matter contained within the lower part of the hopper from clogging, at the same time thoroughly commingling the matter within the hopper when one or more kinds of matter, for instance seed and fertilizer are placed within the hopper. The partition 19 divides the hopper into a lower compartment 25 and an upper compartment 26, and the matter fed from the compartment 26 to the compartment 25 is controlled through the medium of the slide 20, this slide also preventing the compartment 25 from becoming clogged or overloaded. When the matter to be distributed is very fine or in the form of a powder, the slide 20 can be adjusted to almost close the opening 24, while when the matter is granular or in large particles the slide 20 can be opened to allow the matter to rapidly feed to the compartment 25.

An implement in accordance with my invention can be advantageously used for agricultural purposes and is made of light and durable metal, thus allowing the implement to be easily moved.

While in the drawings there is illustrated a preferred embodiment of the invention, it is to be understood that the structural elements thereof can be varied or changed, as to the size, shape and manner of assemblage without departing from the scope of the appended claims.

Having now described my invention what I claim as new, is:—

1. In a distributer, a truck, a hopper supported by said truck having a perforated bottom, a mixer revolubly mounted in said hopper and adapted to be revolved by a movement of said truck, an angularly disposed partition within said hopper and dividing said hopper into two compartments adapted to contain matter, and a slide carried by said partition and adapted to control the passage of matter from one compartment to the other.

2. A distributer comprising an axle, wheels revolubly mounted upon said axle, gear wheels carried by said wheels, a V-shaped hopper supported by said axle, said hopper having a perforated bottom, a shaft journaled transversely of said hopper, a mixer mounted upon said shaft within said hopper, gear wheels carried by the ends of said shaft and adapted to mesh with the first mentioned gear wheels, an angularly disposed partition located in said hopper and dividing said hopper into two compartments, and a slide adjustably connected to said partition and adapted to control the passage of matter from one compartment to the other.

3. A distributer comprising an axle, wheels revolubly mounted upon said axle, gear wheels carried by said wheels, a V-shaped hopper supported by said axle, said hopper having a perforated bottom, a shaft journaled transversely of said hopper, a mixer mounted upon said shaft within said hopper, gear wheels carried by the ends of said shaft and adapted to mesh with the first mentioned gear wheels, an angularly disposed partition located in said hopper and dividing said hopper into two compartments, a slide adjustably connected to said partition and adapted to control the passage of matter from one compartment to the other, and a handle connected to said axle and said hopper.

In testimony whereof I affix my signature in the presence of two witnesses.

JOSHUA B. HUTCHINSON

Witnesses:
E. C. LEIGHTTY,
F. E. LEITZELL.